INVENTOR:
MARION C. JAHN

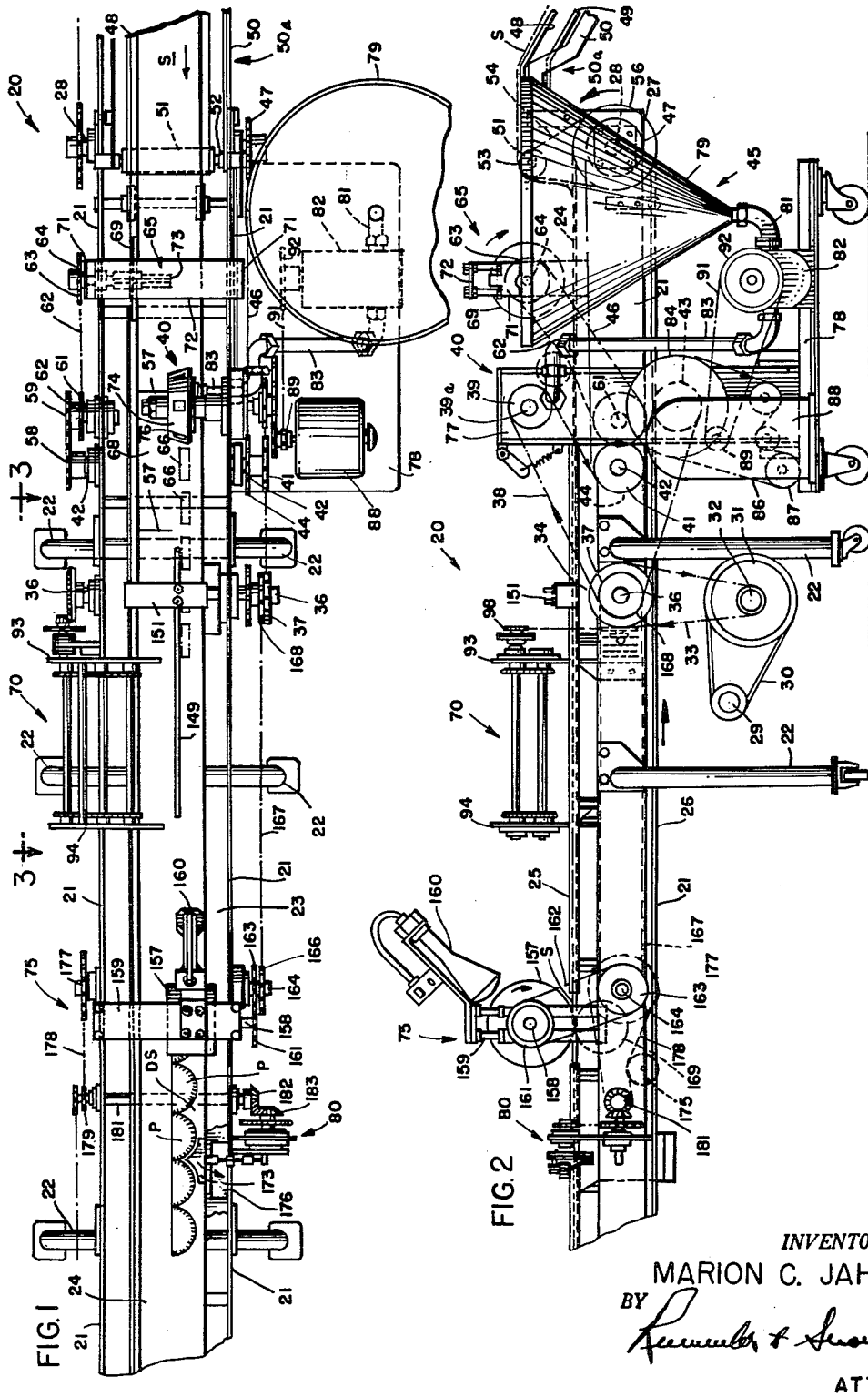

Dec. 3, 1963    M. C. JAHN    3,112,713
AUTOMATIC FRIED PIE FORMING MACHINE
Filed May 17, 1961    6 Sheets-Sheet 3
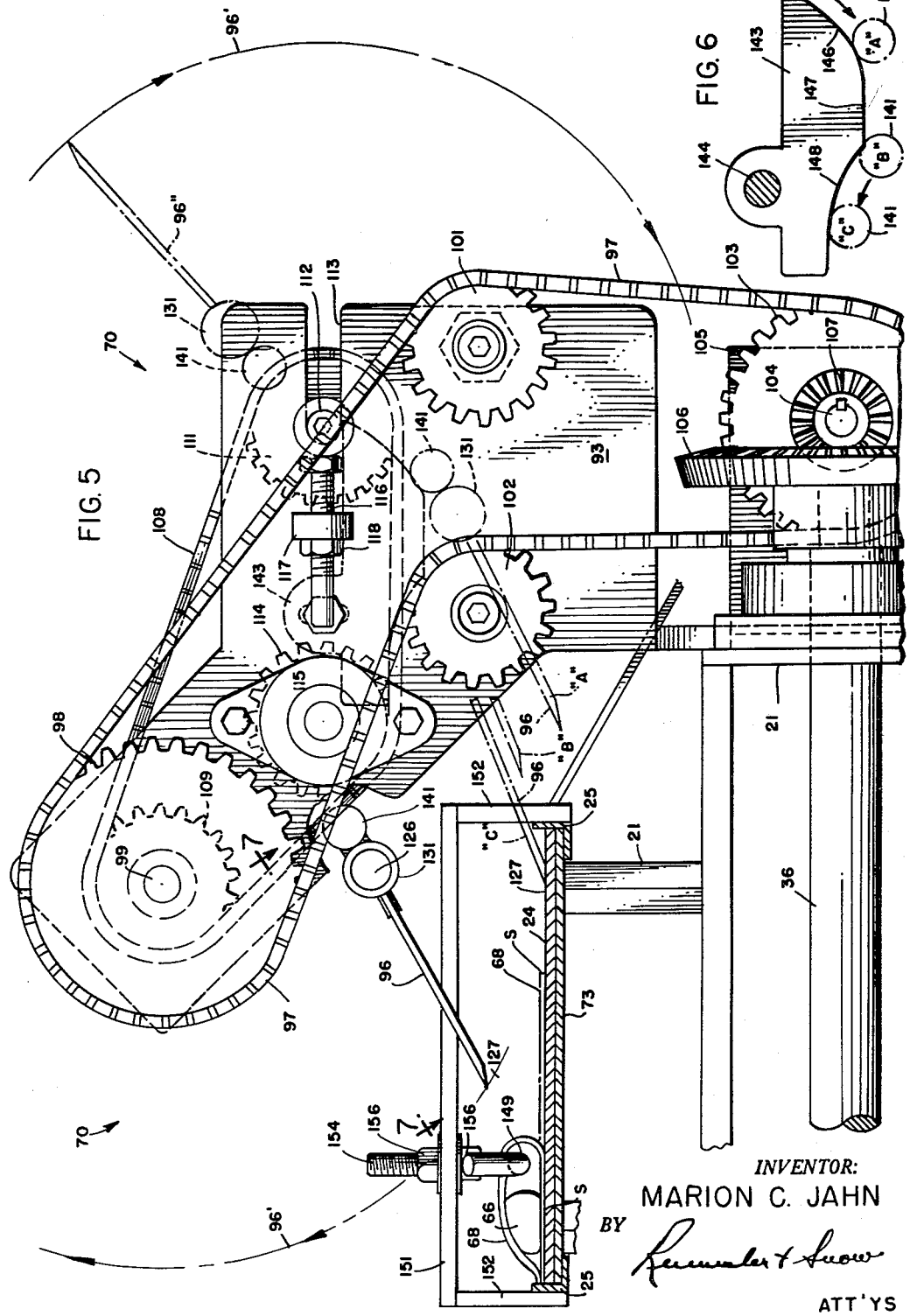
INVENTOR:
MARION C. JAHN
BY
ATT'YS Dec. 3, 1963 M. C. JAHN 3,112,713
AUTOMATIC FRIED PIE FORMING MACHINE
Filed May 17, 1961 6 Sheets-Sheet 4
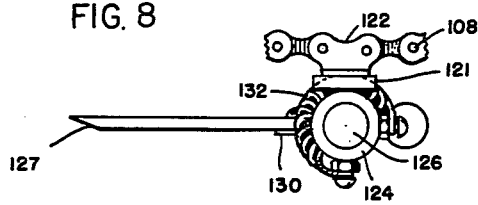
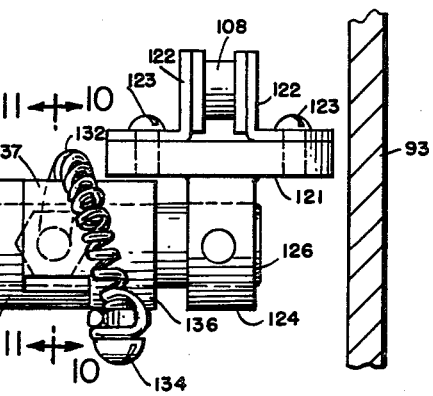
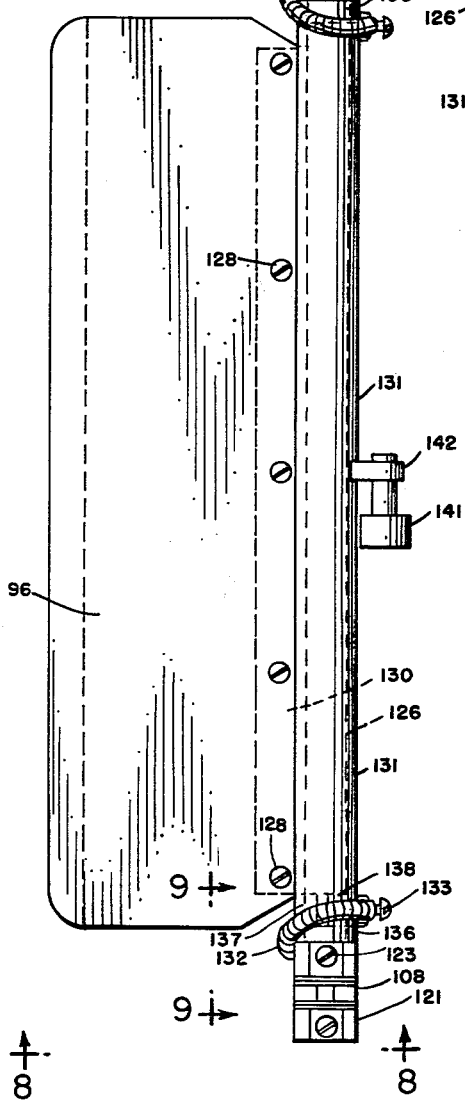
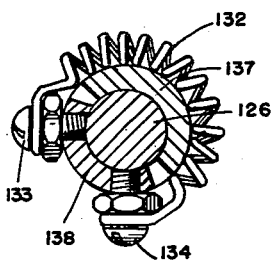
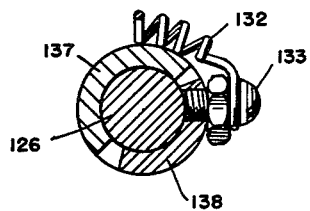
INVENTOR:
MARION C. JAHN
BY
ATT'YS Dec. 3, 1963  M. C. JAHN  3,112,713
AUTOMATIC FRIED PIE FORMING MACHINE
Filed May 17, 1961  6 Sheets-Sheet 5

INVENTOR:
MARION C. JAHN
BY
ATT'YS

Dec. 3, 1963 M. C. JAHN 3,112,713
AUTOMATIC FRIED PIE FORMING MACHINE
Filed May 17, 1961 6 Sheets-Sheet 6
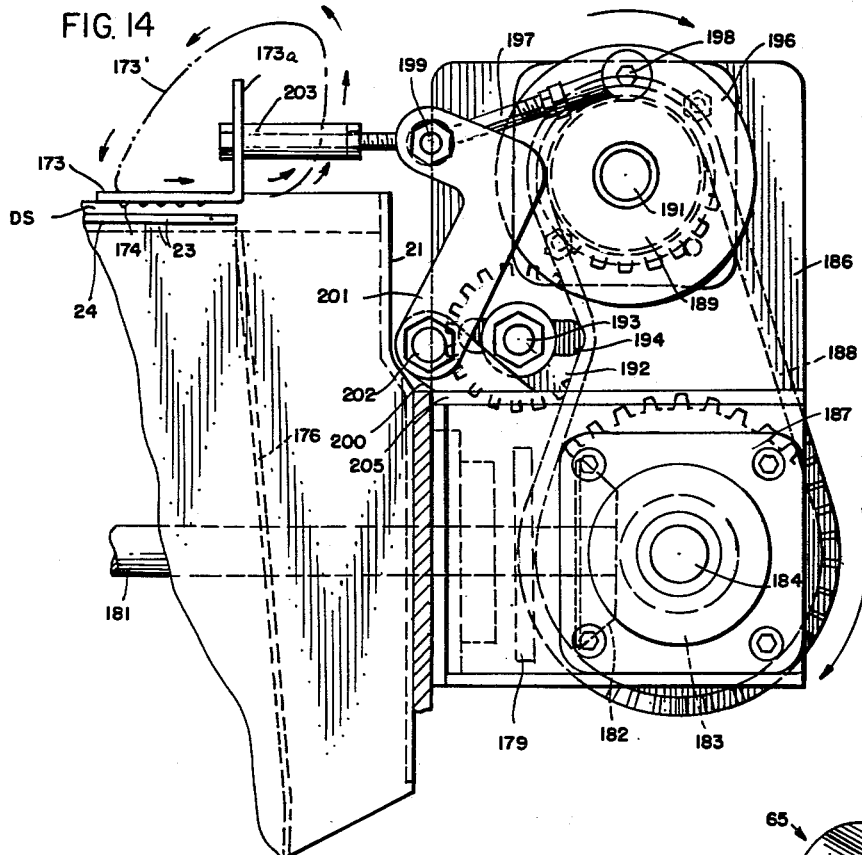
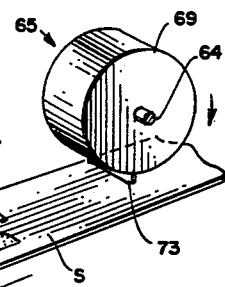
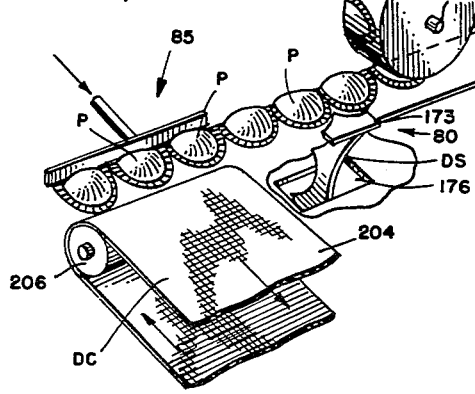
INVENTOR:
MARION C. JAHN
BY
ATT'YS United States Patent Office 3,112,713
Patented Dec. 3, 1963

3,112,713
AUTOMATIC FRIED PIE FORMING MACHINE
Marion C. Jahn, Chicago, Ill., assignor to Colborne Manufacturing Company, Chicago, Ill., a corporation of Illinois
Filed May 17, 1961, Ser. No. 110,764
23 Claims. (Cl. 107—1)

This invention relates generally to machines for making an edible food article, and more particularly to a machine for forming fried pies automatically preparatory to cooking them.

One of the principal objects of this invention is to provide an improved machine for making a filled food article, and generally comprehends a machine for moving a flat edible dough sheet, providing in such machine apparatus for transversely slitting the moving dough sheet for a portion of its width, depositing discrete portions of edible filling on the unslitted sheet portion, folding the slitted sheet portion over the unslitted portion to enclose the filling material, and thereafter shaping, closing and cutting from the folded and filled sheet a discrete edible food article.

Another object is to provide a machine for making a filled pie formed by folding a dough sheet upon itself with an edible filling therebetween, and thereafter forming and shaping the pie, so that it is ready for subsequent cooking operations thereon, such as being fried in deep fat or the like.

Still another object is to provide an automatic machine which is operable upon a moving flat sheet of edible dough, to slit the sheet transversely at intervals throughout its length substantially half the width thereof, to deposit upon the unslitted sheet portion discrete portions of an edible filling, to fold the slitted portions of the moving dough sheet over the discrete edible filling, and then to shape and cut from the folded dough sheet discrete food articles each containing an edible filling.

Another object is to provide an improved process and method for making a filled edible food article which can subsequently be cooked in, for example, a deep frying operation.

Other objects and important features of the invention will be apparent from the following specification taken with the drawings which together describe and illustrate a specific embodiment of the invention, which comprehends both apparatus and method, and what is now considered to be the best mode of practicing the principles thereof. Other embodiments may be suggested to those having the benefit of the teachings herein and such other embodiments are intended to be reserved especially as they fall within the scope and spirit of the subjoined claims.

In the drawings:

FIGURE 1 is a plan view of a machine for forming and making fried pies or the like, said machine embodying the improvements according to the present invention;

FIG. 2 is a front elevational view thereof;

FIG. 5 is an end view of the mechanism seen in FIGS. 3 and 4 as seen from the line 5—5 of FIG. 4;

FIG. 6 is a detailed elevational view of a cam for controlling the movement of the flipper device, forming part of the mechanism seen in FIGS. 3 to 5 inclusive, for folding the dough sheet upon itself;

FIG. 7 is a plan view of a flipping device for folding over the moving dough sheet, said view being taken substantially in the direction of the arrows 7—7 of FIG. 5;

FIG. 8 is an end view thereof, looking in the direction of the arrows 8—8 of FIG. 7;

FIG. 9 is an enlarged elevational view showing a spring structure for controlling the movement of the flipper seen in FIGS. 7 and 8, said view looking in the direction of the arrows 9—9 of FIG. 7;

FIG. 10 is a section view looking in the direction of the arrows 10—10 of FIG. 9, showing further details of the spring structure controlling the movement of the flipper seen in FIGS. 7 and 8;

FIG. 11 is a view looking in the direction of the arrows 11—11 of FIG. 9, showing further details of the spring structure;

FIG. 14 is a side elevational view of the same looking in the direction of the arrows 14—14 of FIG. 12, and showing further details of the structure for removing the scrap dough from the food article; and FIG. 15 is a schematic perspective view illustrating the steps of making and forming the edible food article, and thereafter moving same to a conveyor for a cooking operation.

*General Description of the Machine*

Figure 3:
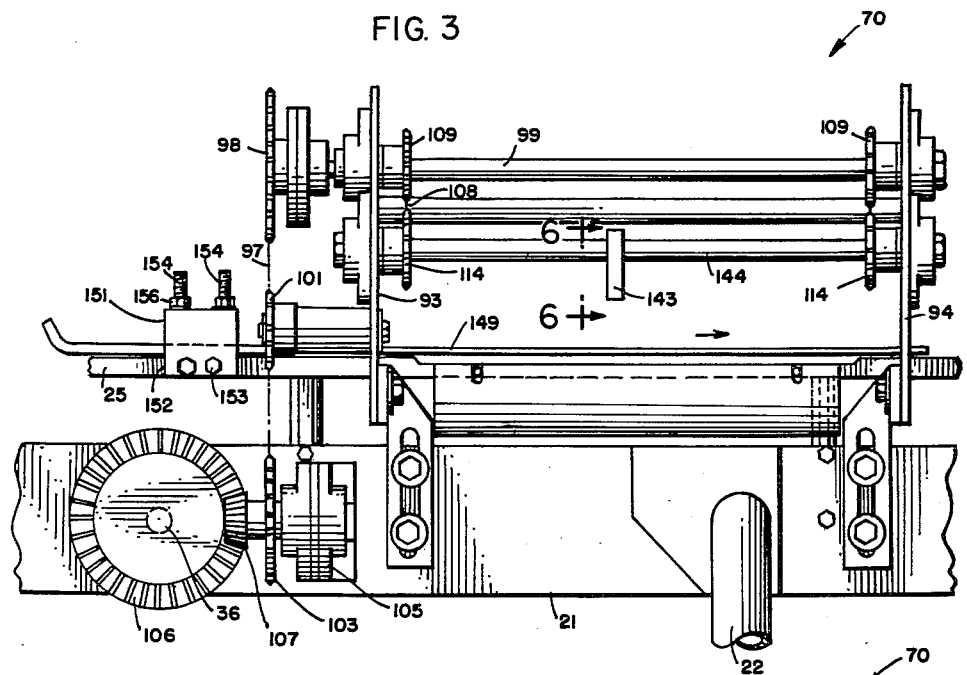
FIG. 3 is an elevational view looking in the direction of the arrows 3—3 of FIG. 1, showing automatic mechanism for folding a moving flat dough sheet upon itself to enclose discrete edible portions of filling which have been deposited on the dough sheet.

Referring now particularly to FIGS. 1, 2 and 15 of the drawings, the improved machine according to the present invention is referred to generally by the reference numeral 20 and includes spaced frame members 21 which are supported upon legs 22. A conveyor table 23 having side walls 25 is supported on the spaced frame members 21, and supports a conveying reach 24 of an endless belt conveyor having a return reach 26, the reaches 24 and 26 being reversed in direction about a driving pulley 27 fixed on a drive shaft 28 mounted in the spaced frame members 21 adjacent the material receiving end of the conveyor.

Power for driving the pulley 27 consists of a motor 29 connected by a belt 30 to a speed reducer 31. An output drive sprocket 32 on the speed reducer 31 drives a sprocket chain 33 reeved about a sprocket 34 fast on a main drive shaft 36 supported in the spaced frame members 21. A sprocket 37 is fast on the drive shaft 36, and in turn drives a sprocket chain 38 reeved about a driving sprocket 39 fast on a shaft 39a. Sprocket 39 drives a filling metering and depositing device referred to generally by the reference numeral 40, and sprocket chain 38 is also reeved about a sprocket 41 fast on a shaft 42 supported in the main frame members 21, and a sprocket 43 forming a main driving point for a filling material supply apparatus indicated generally by the reference numeral 45. A sprocket 44 is fast on the shaft 42, and drives a sprocket chain 46 reeved about a sprocket 47 fast on the shaft 28 to drive the conveyor drive pulley 27.

The machine 20 is supplied with a moving sheet of dough S which is brought up on a dough conveyor 50a having a conveying reach 48 and a return reach 49, the two reaches being reversed in direction about a driving pulley 51 fast on a shaft 52 supported in frame memebrs 50 of the dough conveyor. A sprocket 53 drives pulley 51 of dough conveyor 50a and is fast on the shaft 52, and a sprocket chain 54 is trained between the sprocket 53 and a sprocket 56 fast on the shaft 28, so that the moving dough sheet S is moved onto the conveying reach 24 at substantially the speed thereof. As seen in FIGS. 1 and 2, dough conveyor 50a overlies the conveying reach 24 in a fashion that the dough sheet S is deposited as a continuous strip thereon.

As the sheet S moves with the conveying reach 24 it is slitted transversely at regular intervals throughout its length to provide in the moving dough sheet transversely extending slits 57. Each of such slits 57 extends for a distance equal approximately one-half the width of the moving dough sheet S, and automatic means is provided for slitting the sheet S as just described. To this end the shaft 42, which extends transversely of the machine carries gear 58 on the far side which meshes with gear 59 fast on a stub shaft 61. A sprocket 62, also fast on the shaft 61, drives a sprocket chain 62 which is reeved about a sprocket 63 fast on a rotatably mounted shaft 64 which drives directly a slitter device referred to generally by the reference numeral 65.

After the sheet S moves past the slitting mechanism 65, discrete portions 66 of edible filling material are placed upon the near or unslitted portion of the moving sheet S, at spaced intervals, by the filling metering and depositing device 40. The details of the device 40 will not be described herein since they are fully disclosed and described in D. W. Smith Patent No. 2,673,019, issued March 23, 1954, for Receptacle Filling Machine, to which patent reference is hereby made.

The moving sheet S, which now has the discrete filling portions 66 placed thereon at predetermined, uniformly spaced intervals, moves past a flipper mechanism, referred to generally by the reference numeral 70, which folds a slitted portion 68 of the moving sheet S, defined by the transverse slits 57, over the edible filling portions 66 to enclose them. Details of the flipper mechanism 70 will be described fully as the specification proceeds.

The moving dough sheet S, which now is folded with the discrete filler portions 66 enclosed between two layers of the dough sheet, then moves past a mechanism for forming and trimming individual pies or units from the folded and filled dough sheet, such mechanism being indicated generally by the reference numeral 75. Details of such mechanism is fully described in my application Serial No. 798,431, filed March 10, 1959, for Improvements in Mechanism for Forming Filled Dough Shapes for Fried Pies and the Like, and accordingly is not described in complete detail in this application.

The mechanism 75 forms and shapes and trims the folded and filled dough sheet into a filled pie P, and the dough scrap DS, see FIG. 15, is removed from the pies P and the conveyor 24 by a scrap picker referred to generally by the reference numeral 80. After the dough scrap DS is separated from the formed pies P, the conveyor 24 moves the pie P to a delivery station indicated generally by the reference numeral 85, see FIG. 15, where the formed pies P may be delivered to a delivery conveyor DC. Mechanism for delivering the filled pies P from the conveying reach 24 may be of any suitable type, and is indicated by a pushing device, as shown, which delivers the pies laterally from the conveyor 24.

*Details of Slitting Mechanism*

The slitter mechanism 65, shown in FIGS. 1, 2 and 15, comprises a wheel or similar annular means 69 fast on the shaft 64 which in turn is supported by arms 71, extending upwardly from the spaced frame members 21 and spanned by a horizontal bracing member 72. A slitting knife 73, extending parallel with the shaft 64, is mounted rigidly on the periphery of the wheel 69 and is positioned to cut transverse slots 57 of predetermined length in the moving dough sheet S. The height of the slitter device is made adjustable so that the knife 73 will engage the surface of the conveyor 24 with just sufficient pressure to cut through the dough sheet and form open slots 57. The speed of rotation of the wheel 69, is determined by its drive means and is, of course, proportioned to cut the slots 57 in the dough sheet at intervals of predetermined length, as will hereafter appear.

*Details of Filling Metering and Depositing Mechanism*

The structure for depositing metered quantities of edible filling 66 upon the moving dough sheet S is referred to generally by the reference numeral 40, and is described in detail in the aforementioned Smith patent. However, for purposes of description at this point, the metering mechanism 40 includes a rotating head 74 having openings 76 therein through which the metered quantities of filling material are deposited successively upon the moving dough sheet S. The rotating head 74 is fast on the shaft 39a, and is driven by the sprocket chain 38 which is reeved about the sprocket 39 fast on the shaft 39a. The shaft 39a, supporting the metering device 74, is mounted in a standard 77, which extends upwardly from a wheel-mounted dolly 78, and the standard 77 is detachably secured to one of the side frames 21 as seen in FIGS. 1 and 2. The dolly 78 supports a filler hopper 79 connected by a pipe 81 to a pump 82, the output from which is connected by a pipe 83 to supply the rotating depositing head 74. Power for driving the pump 82 is provided by a sprocket 84 mounted on the shaft of the sprocket 43, the sprocket 84 having a chain 86 reeved thereon, which drives an input drive sprocket 87 of a speed reducer 88. An output sprocket 89 of the speed reducer drives a chain 91 reeved about a drive sprocket 92 for the pump 82.

*The Dough Sheet Flipper Mechanism*

Figure 4:
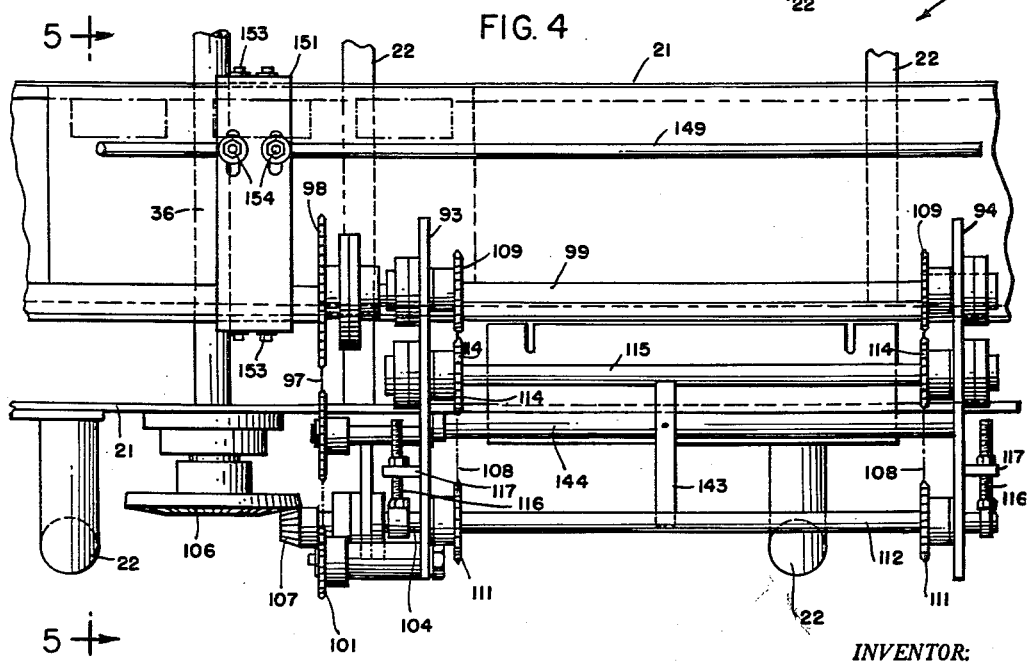
FIG. 4 is a plan view of the mechanism seen in FIG. 3.

The flipper mechanism 70, which folds the split portions 68 of the moving sheet S over the spaced fillings 66, is best seen with reference to FIGS. 3, 4 and 5. As shown, the flipper mechanism 70 is supported by a pair of spaced side plates 93 and 94 which, in turn, are secured to the machine side frames 21 in any convenient manner. The flipper mechanism includes a flipper blade 96 arranged to move in an orbital manner, the mechanism being driven by an endless sprocket chain 97 reeved around a drive sprocket 98 fast on a shaft 99 supported in the spaced side plate members 93 and 94. The endless chain 97 is also reeved about idler sprockets 101 and 102 supported on the frame 93 and power for driving the chain 97 is provided by a driving sprocket 103 fast on a shaft 104. As shown, the shaft 104 is driven by a pair of bevelled gears 106 and 107 which are in meshing engagement, gear 106 being fast on the main drive shaft 36 and gear 107 being fast upon the shaft 104 which is supported in a pillow block 105 mounted on the main frame member 21.

The flipper 96 is supported at each end upon endless sprocket chains 108 which are driven by sprockets 109 fast upon the shaft 99. Sprocket chains 108 are reeved about idler sprockets 111, turning upon an adjustable idler shaft 112 held in slots 113 in the support frames 93 and 94. The chains 108 are also reeved about idler sprockets 114 mounted on a fixed position shaft 115 supported in the frames 93 and 94 in horizontally spaced relation with the shaft 112. As shown in FIG. 5, the shaft 99 is disposed forwardly and above the idler shafts 112 and 115 so as to overhang the conveyor belt 24 running along the table 23. The flipper blade 96 is thus carried across the conveyor belt so that the leading edge of the blade can follow the orbital path, indicated by the arrows 96′, required for dough sheet folding operation hereafter explained.

Structure is provided for adjusting the tension in the flipper chains 108 by adjusting the position of the idler shaft 112, and to this end an adjusting screw 116 abutting each end of the shaft 112 is arranged to turn within a stationary nut 117 secured on the respective support plates 93 and 94. A suitable locking nut 118 is provided on each screw to maintain the adjusted position of the idler shaft 112.

Each of the endless sprocket chains 108 is provided with a lug 121 secured by screws 123 to brackets 122 mounted on one of the chain links, see FIGS. 7 to 9, and each of the lugs 121 is formed with a pillow block 124 affording a support for a shaft 126 which spans the distance between the two chains 108. The flipper plate 96 has a bevelled leading edge 127 and its rearward end is held by screws 128 to a longitudinally extending flange 130 which is integral with a sleeve 131 rotatably surrounding the shaft 126.

A lost motion driving connection is provided between the shaft 126 and the sleeve 131 and includes a spring 132 encircling each end of the sleeve 131, the spring 132 having one end connected to the sleeve 131 by a screw 133 and the other end connected to a set screw 134 which is tapped into a collar 136 also supported on the shaft 126 and non-rotatably secured thereto by the set screw 134. The collar 136 has an axially projecting flange 137 which is in mating engagement with a corresponding flange 138 extending in an opposite direction from the sleeve 131. However, flange 137 embraces a larger angular distance than the flange 138, and it will be seen that the sleeve 131 can thus rotate through a limited angle with respect to the collar 136, the amount of such movement being limited to the difference in the angular lengths of the flanges 137 and 138.

The aforesaid lost motion connection enables the flipper 96 to oscillate about the shaft 126 so that the flipper can be projected against the surface of the conveyor 24 to engage beneath the dough sheet S, between the transverse slits 57, for a sufficient distance to lift and fold the same over the edible filling portions 66 as shown in FIG. 5.

In order to control the motion of the flipper 96, the sleeve 131 is provided with a cam follower 141 in the form of a roller mounted on a stub shaft which extends from a lug 142 secured to the sleeve 131. The cam follower cooperates with a cam 143, see FIG. 6, secured on a support rod 144 which extends between the side plate members 93 and 94 as indicated in FIGS. 3 and 4. Normally the flipper 96 adopts a set position with respect to the chain 108, such as indicated at 96″ in FIG. 5, determined by the spring 132 and the angular position of the collar 136 on the shaft 126, as the chain moves orbitally about the sprockets 109, 111 and 114. However, the cam 143 and the follower 141 cooperate with each other so as to move the flipper 96 on its support shaft 126 against the bias of the spring 132, so that the leading bevelled edge 127 of the flipper 96 can move upwardly and over the adjacent edge of the table side wall 25 and into position to engage the surface of the conveyor 24 and enter beneath the transversely slitted section 68 of the dough sheet S to raise the same from the conveying reach 24. The cam 143 accordingly has a camming surface 146 which, upon engaging the follower 141, moves the flipper 96 toward a position "A" relative to chain 108, during approximately the first quarter of its horizontal travel between the sprockets 111 and 114. When the cam follower reaches the flat horizontal portion 147 of the cam 143 the flipper 96 is rotated on its shaft, and relative to the sprocket chain 108, an angular distance sufficient that its leading edge is elevated above the table side wall 25, as indicated by the dotted outline "B" in FIG. 5, and this position is maintained by a cam portion 147 until the leading edge of the flipper 96 has moved past the side wall 25. Thereafter the follower 141 passes onto a cam surface 148 of cam 143 which is formed to permit the flipper 96 to drop so that the bevelled edge 127 will engage and follow the surface of the conveying reach 24 as indicated at "C" in FIG. 5, the flipper being urged against the conveying reach 24 by the bias of the said spring 132. The edge 127 of the flipper blade 96 then moves beneath the portion 68 of the dough sheet S and raises the same as the chain 108 turns about the sprocket 114 and carries the flipper blade upward and to the left, as seen in FIG. 5, along the path of the arrows 96′. Thus, as the flipper is carried upwardly and forwardly, across the conveyor reach 24, the portion 68 of the dough sheet is lifted and folded over the filling 66 as shown in FIG. 5.

Structure is provided which forms an abutment, over which the portion 68 is folded, to assure a proper extent of fold and to this end there is provided a folding bar 149 which extends in the direction of movement of the dough sheet S. The folding bar 149 is held at its upstream end by a suitable bridge or frame 151 which spans the table 23, the frame 151 having support legs 152 held by cap screws 153 to the sides 25 of the table 23. As indicated in FIGS. 3, 4 and 5, the folding bar 149 has a pair of threaded upstanding arms 154 integrally secured thereto adjacent its up-stream end, which arms extend through the bridge 151 and are adjustably held by clamping nuts 156.

It will be understood that following a folding operation the flipper 96 travels orbitally with the chain 108 and completes the orbit at a speed such as to be in proper positoin to engage and fold the next successive section of the transversely slitted dough sheet S as it comes into position, on the conveying reach 24, opposite the flipper station 70.

Details of Apparatus for Forming the Filled and Folded Dough Sheet

Mechanism for forming the filled and folded over dough sheet S has been heretofore referred to generally by the reference numeral 75, and complete details of the mechanism are as shown in my above mentioned copending application Serial No. 798,431. However, for purposes of description at this point and referring particularly to FIGS. 1, 2, 12 and 13 of the drawings wherein the mechanism is more or less diagrammatically shown, the mechanism includes a forming wheel 157 which is fast on a shaft 158 supported in a frame 159. Shaft 158 is fast with a sprocket 161 having a chain 162 reeved thereover, chain 162 being also reeved about a sprocket 163 fast on a cross-shaft 164 supported in the spaced frame members 21. Shaft 164 also has a sprocket 166 fast thereon which is driven by a chain 167 which is reeved about a sprocket 168 fast on the drive shaft 36, see FIGS. 1 and 2.

Figure 13:
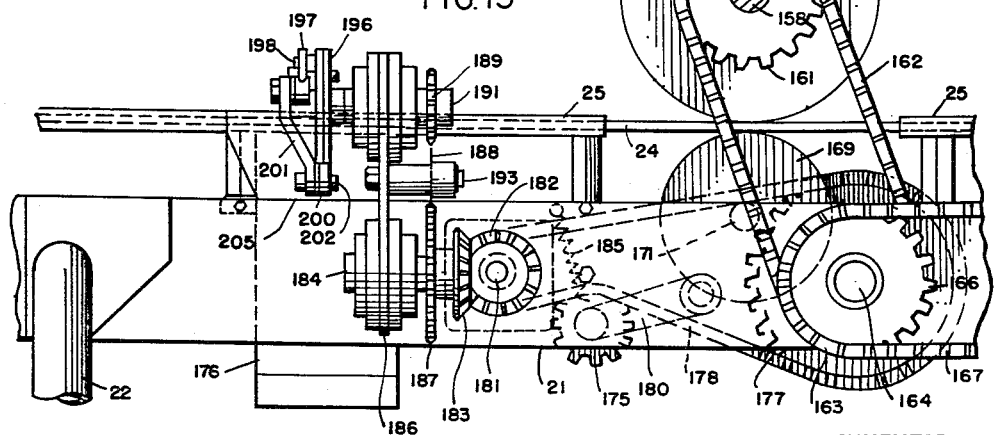
FIG. 13 is an elevational view of the mechanism seen in FIG. 12.

The forming wheel 157 rotates in the direction as seen in FIG. 13, and this forming wheel has a plurality of forming dies 155 in the periphery thereof, see FIG. 15, which give the form to the pie P as seen in FIGS. 1 and 15. Details of the forming wheel 157 are as shown in my aforesaid copending application.

The folded dough sheet S and the conveying reach 24 move between the forming roller 157 and an idler anvil roller 169 arranged to turn on a shaft 171 supported in the side frames 21. In order that the pressure may be applied between forming roller 157 and anvil roller 169 to form the dough pies P, the table 23 is discontinuous at that location as seen in FIG. 13. It has been found that the forming operation is best done when the forming dies are warm, and to provide heat therefor the frame 159 supports an infra red heating lamp 160 as best seen in FIG. 2.

Details of Dough Scrap Picker Mechanism

Figure 12:
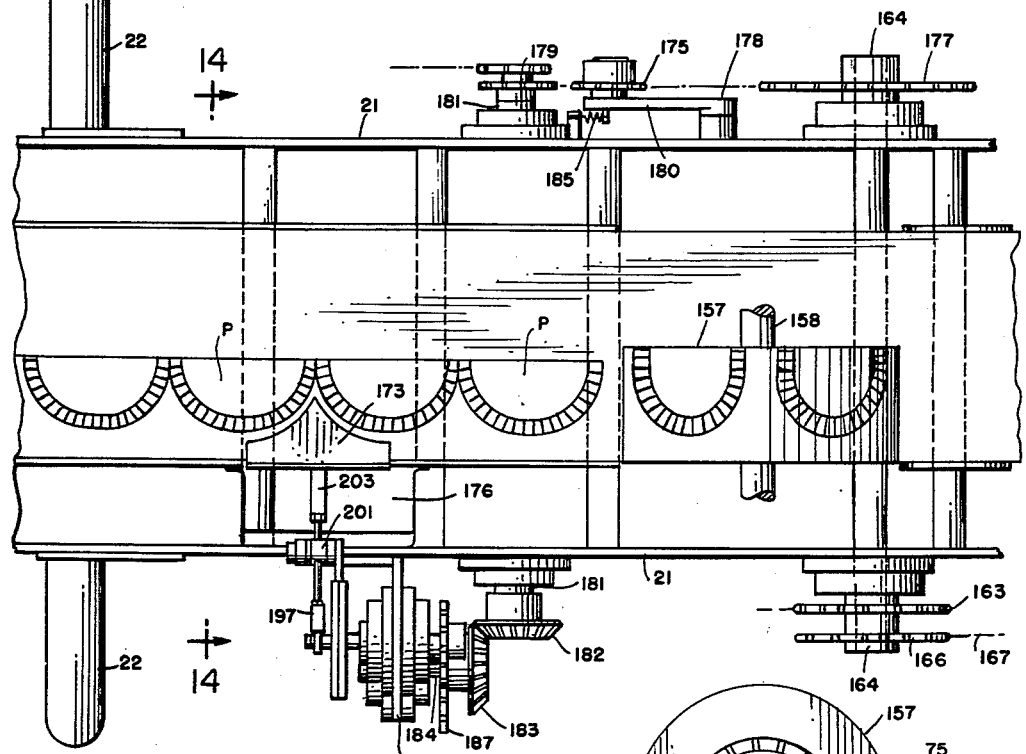
FIG. 12 is a detailed plan view to a portion of the machine seen in FIG. 1, showing details of structure for removing scrap dough trimmed from the completed food article.

Details of the scrap or trimmings picker mechanism 80 are best shown with reference to FIGS. 12, 13 and 14, and comprises a picker member 173 having a configuration as seen in FIGS. 12 and 15, and arranged to have a path of movement as indicated by the dot-dash line 173′ in FIG. 14. The picker member is a plate having short teeth 174 or serrations on its underside for engagement with the dough scrap DS remaining after the individual pies have been formed, as seen in FIGS. 1 and 15, so that upon translative movement of the picker 173, to the right as seen in FIG. 14, the dough scrap DS is pulled off the conveyor 24 laterally to fall down a scrap dough chute 176 mounted on the front frame member 21.

Structure for giving the desired translative movement to the scrap picker 173 is shown in FIGS. 12–14, and to this end the shaft 164, see FIG. 13, has a sprocket 177 fast thereon and connected by a sprocket chain 178 to a drive sprocket 179 fast on a shaft 181 supported at each end in the frame members 21. An idler take-up sprocket 175 is mounted on an arm 180, pivotally mounted on the frame 21, and a spring 185 imposes the proper amount of tension on the chain 178.

A bevel gear 182 fast on the shaft 181 meshes with a bevel gear 183 fast on a shaft 184 supported in a frame 186 secured to the front frame member 21. The shaft 184 has a sprocket 187 thereon, and a sprocket chain 188 is trained between the sprocket 187 and a sprocket 189 fast on a shaft 191 also supported on the frame member 186.

Slack take up is provided for the chain 188 by an adjustable idler 192 (see FIG. 14) mounted on a shaft 193 adjusted for movement in a slot 194 in the frame 186.

The shaft 191 has a crank plate 196 fast thereon, and a link 197 is pivoted at 198 to the crank plate 196. The link 197 is also pivotally connected at 199 to a rock arm 201 which is pivotally connected at 202 on a bracket 200 extending from a support 205 on frame 21.

The picker member 173 has an up-standing leg 173a rigidly connected to an adjustable length connecting rod 203, which is an integral extension of the link 197, projecting beyond the pivot 199 on the rock arm 201. The rotation of the crank plate 196 in the clockwise direction, as seen in FIG. 14, together with the pivoted link connection on the rock arm 201 causes the link 197 to give an out-up-in-down gyratory motion to the picker plate 173 as shown by the path 173' in FIG. 14. Each cycle of movement of the scrap picker 173 thus causes the picker to engage downwardly on the scrap dough strip DS and to pull it away from the pies P and off the conveyor reach 24 for discharge down the chute 176. The speed of operation of the picker 173 is governed to cause the picker to engage the dough scrap at least between successive pairs of the pies P so that the scrap removal is substantially continuous.

At the conclusion of the scrap removal operation just described, the filled and formed pies P are moved by the conveying reach 24 to the delivery end of the conveyor. At that point the formed pies P can be transferred by any suitable means, as by a reciprocating pusher 85, onto a delivery conveyor DC. The delivery conveyor DC may be formed of a suitable foraminous endless strip 204, trained about a roller 206, and adapted, if desired, to convey the formed pies P through a deep fat frying kettle, not shown, for a final cooking operation.

*Summary*

From the foregoing description, it is believed evident that there has been provided some new and useful improvements in the art of filling a dough sheet and forming it into an edible article such as a pie or the like.

The main advantages of this invention reside in the fact that the manufacture of a complete pie is accomplished automatically, without manual effort except as is necessary to maintain the supply of the raw materials; and in the fact that the filling, forming and final discharge is accomplished in a continuous, uninterrupted series of correlated operations performed on a continuously traveling conveyor means whereby a greatly increased production rate is obtained. Other advantages are found in the novel operation of folding a continuous dough strip upon itself, to enclose the filling material, whereby scrap or waste remaining from the final pie forming operation is minimized and production cost is thereby greatly reduced.

While the invention has been described in terms of a preferred embodiment thereof, the scope of the invention is not intended to be limited by the precise embodiment herein shown and it is intended that the scope of the invention include the process of the invention as described. Therefore, it will be understood that numerous details of the invention herein disclosed may be altered or omitted without departing from the spirit of the invention as defined by the following claims.

I claim:

1. A machine of the class described comprising, a continuously moving conveyor for transporting a flat elongate strip of sheeted dough in the lengthwise direction thereof, means actuated in timed relation with the travel of said conveyor for slitting said strip transversely thereof at spaced intervals therealong, the slits extending part way across said strip from one edge thereof, means for depositing automatically a quantity of edible filling material on the moving strip at predetermined intervals therealong and adjacent the strip edge opposite said one edge, means for folding the slitted portions of the moving strip successively and from said one edge toward the opposite edge to cover said filling material, and means actuated in timed relation with the depositing means for shaping, crimping and cutting discrete edible articles from the filled portions of the folded strip as it is carried on said conveyor.

2. A machine of the class described comprising, a conveyor for moving a continuous flat strip of sheeted dough in the lengthwise direction thereof, means for slitting said strip transversely thereof at intervals therealong, means for depositing a quantity of filling material on that portion of the moving strip between the slits, means for successively folding the portions of the moving strip between the slits from one edge of the strip toward the other to cover said filling material, a stationary fold bar extending longitudinally above said strip to provide an abutment over which the strip portions between the slits are folded, and pressure means acting against the folded strip as it is carried by said conveyor for shaping and cutting discrete edible articles from the aforesaid filled and folded strip.

3. The machine as described in claim 2 including means for removing the remainder of the dough strip from around the said edible articles as they are carried by said conveyor.

4. A machine of the class described comprising, a frame, a conveyor on said frame for transporting a continuous flat sheet of dough in the lengthwise direction thereof, means acting against said conveyor for slitting said sheet transversely thereof from one edge to a point substantially mid-way between the longitudinal edges thereof, means for depositing a quantity of edible filling material at longitudinally spaced intervals on that portion of the moving sheet beyond the inner ends of the slits, means for folding the slitted portions of the moving sheet in the transverse direction to cover said filling material, a fold bar extending longitudinally above said sheet and over which said slitted sheet portions are folded to locate the line of fold, and means for shaping and marginally crimping and cutting from the aforesaid folded and filled sheet a series of discrete edible articles.

5. The machine defined in claim 4 wherein the folding means lifts and folds the slitted portions of the moving dough sheet individually and successively to turn said slitted portions over the fold bar and cover the filling material deposited on the opposite portions of the moving sheet.

6. A machine for making a filled edible article comprising, means for moving an elongate dough sheet in the longitudinal direction thereof, means for slitting the moving dough sheet transversely at intervals throughout the length thereof, means for depositing discrete quantities of edible filling material upon the moving dough sheet between the slits and adjacent one side thereof, means for folding each slitted portion of said dough sheet upon itself in the transverse direction of the sheet travel to cover said discrete quantities of filling material, and automatic means operating in timed relation with the depositing means for shaping, marginally crimping and cutting-out from the folded and filled sheet a series of discrete edible food articles.

7. A machine as defined in claim 6 wherein the first named means is a continuously moving conveyor.

8. A machine as defined in claim 6 wherein the last named means comprises a die having a crimping and cutting ridge of generally U-shaped contour for engaging the folded and filled dough sheet with the legs of the said ridge overhanging the fold of the said sheet.

9. A machine as defined in claim 6 wherein the first named means is a continuously moving conveyor, and the last named means comprises a rotating drum mounted above the conveyor on an axis extending transversely thereof, said drum having a plurality of angularly spaced peripheral forming dies each of which comprises a generally U-shaped cutting and crimping ridge disposed to engage the folded and filled dough sheet with the legs of the ridge overhanging the fold of said sheet.

10. A machine as defined in claim 9 including means for engaging and pulling away, laterally of the conveyor, the margins of the folded dough sheet cut away from the said discrete food articles.

11. In a machine for making a filled edible article, conveyor means for moving a dough sheet, means for depositing quantities of edible filling material upon the dough sheet at spaced intervals therealong, means for folding the dough sheet upon itself to cover said quantities of edible filling, means for shaping, marginally crimping and cutting-out said article from said folded and filled sheet; the combination therewith of means for removing the cutaway scrap portions of said dough sheet from each of said articles comprising a picker for engaging the scrap dough intermittently, and pulling it laterally away from the articles, and means for moving said picker in an orbital path in a vertical plane including a translative movement outwardly from the conveyor means and transverse the direction of movement thereof.

12. The combination as defined in claim 11 wherein the orbital path of the picker extends above the conveyor means and transverse the adjacent margin of the dough sheet, and the picker engages the scrap dough during a movement toward the surface of the conveyor means and pulls the scrap dough laterally of the conveyor means during a translative movement outwardly from the conveyor means and substantially parallel with the plane of the top surface thereof.

13. The combination defined in claim 11 wherein the means for shaping, crimping and cutting-out the said article comprises a die having a generally U-shaped crimping and cutting ridge disposed with its legs extending across the fold of the dough sheet, and wherein the scrap dough cut away from the cut-out article comprises the marginal portions of the folded dough sheet opposite the fold.

14. A machine for making discrete filled edible articles comprising, a continuously moving conveyor means for transporting an elongate strip-like dough sheet, means for slitting the moving dough sheet at uniform intervals throughout its length for a distance inwardly from one edge of the sheet substantially equal to one-half the width thereof, means for depositing discrete quantities of edible filling material at spaced intervals upon the unslitted width of said moving dough sheet, means for folding the slitted portions of said dough sheet individually over the opposite unslitted width thereof to cover said quantities of filling material, means for shaping, crimping and cutting-out said articles from the folded and filled sheet, and means for removing the cut-away scrap portions of the moving dough sheet from each of said articles, the last named means comprising a picker member for engaging the scrap dough intermittently and pulling it laterally away from the said articles and off from the conveyor, and means for moving said picker member in timed relation with the movement of said conveyor means and along an orbital path extending above the conveyor means and transversely of the adjacent margin of the dough sheet, the last named means causing the picker member to engage the scrap dough during a movement toward the surface of the conveyor means and to pull the scrap dough laterally of the conveyor means during a translative movement substantially parallel with the plane thereof.

15. The machine defined in claim 14 wherein the means for shaping, crimping and cutting-out the said articles comprises a drum mounted for rotation on an axis extending transversely above the conveyor means and having a plurality of angularly spaced peripheral dies, each of said dies has a generally U-shaped crimping and cutting ridge disposed with its legs extending axially of the drum and across the fold of the dough sheet, means are provided to rotate the drum in peripheral contact with the dough sheet and at a peripheral speed equal to the speed of the conveyor means, and wherein the scrap dough cut away from the cut-out articles comprises the marginal portions of the folded dough sheet opposite the fold therein.

16. In a machine for making a filled food article, means for conveying an elongate sheet of edible dough, means for slitting said moving sheet transversely at intervals throughout the length thereof, means for depositing an edible filling material on the said sheet adjacent one side margin thereof, and means for folding the said dough sheet transversely upon itself to cover said filling material, said folding means comprising a flipper blade mounted for limited rotary movement about an axis parallel with the direction of travel of the conveyor means, means for moving the axis of said blade in an orbital path extending transversely above and normal to the plane of said conveyor means, means resiliently holding said blade in a normal angular position with respect to its axis and said moving means, the travel of said blade being inwardly toward the center of the conveyor means adjacent the sheet carrying surface thereof and then upwardly and outwardly along said orbital path, and cam means for turning said blade about its axis and out of its normal position as it approaches the surface of said conveyor means whereby the free end of said blade is caused to engage the conveyor means surface and slide therealong beneath the portion of said dough sheet opposite said filling material to lift and turn same to the aforesaid folded position.

17. In a machine for making a filled food article, conveyor means for moving an elongate sheet of edible dough, means for slitting said dough sheet transversely at intervals throughout the length thereof and for a distance from one edge of the sheet to substantially one-half the width thereof, means for depositing quantities of an edible filling material on the portion of the sheet beyond the inner ends of the slits, and means for folding the slitted portions of said dough sheet over the opposite half-width of said sheet so as to cover said filling material, the last named means comprising a flipper blade mounted for limited angular movement about an axis parallel with the direction of movement of said conveyor means and including means for moving said blade and its axis in an orbital path extending transversely of and above the conveyor means and normal to the plane thereof, resilient means maintaining said blade at one limit of its angular movement about said axis and in a normal position with respect to its moving means, and means for moving said blade angularly about its axis and out of its normal position at a predetermined portion of its orbital path whereby the free end of said blade will engage the dough sheet carrying surface of the conveyor means and slide thereacross beneath the slitted portion of said dough sheet whereby to lift and turn the same to the aforesaid folded position, said last named means including a fixed cam and a follower means on said blade for turning said blade about its axis, and the orbital path of said blade being inward toward the center of said conveyor means in the portion of the path nearest the plane of the conveyor means.

18. Means for folding sheeted dough comprising, a conveyor for transporting a dough sheet and means for driving the conveyor, a flipper blade mounted at one end for limited angular movement about an axis extending parallel with the direction of travel of the conveyor, said blade being in a plane parallel with said axis, means overhanging said conveyor from one side thereof for carrying said blade and its axis through an orbital path extending transversely above the conveyor and normal to the plane of the sheet carrying surface thereof, said blade being carried inwardly toward the center of said conveyor during the lower portion of its orbital path, resilient means for normally holding said blade at one limit of its angular movement above said axis as the blade is carried along its orbital path, and cam means for moving said blade angularly about its axis against the action of said resilient means during its travel along the lower portion of said orbital path whereby the free end of the blade is caused to bear upon and slide across the sheet carrying surface of the conveyor and engage beneath the adjacent margin of the said dough sheet to lift and turn the same.

19. The dough sheet folding means defined in claim 18 wherein the flipper blade is mounted on a shaft extending parallel with the conveyor travel, and the means for carrying the blade through its orbital path comprises a pair of parallel laterally spaced endless chains between which the said shaft extends and on which the said shaft is mounted, each of said chains running over a pair of sprockets spaced apart transversely of the conveyor and journaled in a vertical frame member at one side of the conveyor.

20. The dough sheet folding means defined in claim 19 wherein one of each pair of said chain sprockets is driven in timed relation with the travel of said conveyor.

21. Means for removing scrap sheet material from the top surface of a substantially horizontal conveyor comprising a vertical support means, a lever pivoted at one end on said support means for rocking movement in a vertical plane toward and away from one edge of said conveyor, a bell crank pivoted on the other end of said lever on a horizontal axis extending parallel with the travel of said conveyor, one arm of said bell crank extending toward said conveyor, a picker member mounted on the end of said one bell crank arm and extending over the adjacent margin of the conveyor, and crank means connected to the other arm of said bell crank for rocking said bell crank about its pivot connection with said lever and simultaneously rocking said lever about its pivot on said support means, whereby said picker member is caused to follow an orbital path lying in a plane normal to and transversely of said conveyor top surface.

22. The mechanism defined in claim 21 wherein said lever is pivoted below the plane of said conveyor top surface and said crank means is turned in a direction to cause said picker member to move outwardly from the conveyor while traveling the portion of said orbital path next adjacent the said conveyor surface.

23. The mechanism defined in claim 21 wherein said crank means is rotated in timed relation with the lineal movement of said conveyor.

References Cited in the file of this patent
UNITED STATES PATENTS

| | | |
|---|---|---|
| 1,032,069 | Lawrence | July 9, 1912 |
| 1,711,228 | Duvall et al. | Apr. 30, 1929 |
| 2,276,282 | Bindszus | Mar. 17, 1942 |
| 2,588,454 | Abel et al. | Mar. 11, 1952 |
| 2,759,433 | Szadziewicz et al. | Aug. 21, 1956 |